US012624570B2

(12) United States Patent
Mancini

(10) Patent No.: US 12,624,570 B2
(45) Date of Patent: May 12, 2026

(54) DOOR LOCK WITH ASSOCIATED KEYS

(71) Applicant: Vincenzo Mancini, Rome (IT)

(72) Inventor: Vincenzo Mancini, Rome (IT)

( * ) Notice: Subject to any disclaimer, the term of this patent is extended or adjusted under 35 U.S.C. 154(b) by 58 days.

(21) Appl. No.: 18/847,651

(22) PCT Filed: Mar. 13, 2023

(86) PCT No.: PCT/IB2023/052393
§ 371 (c)(1),
(2) Date: Sep. 16, 2024

(87) PCT Pub. No.: WO2023/175472
PCT Pub. Date: Sep. 21, 2023

(65) Prior Publication Data
US 2025/0198195 A1 Jun. 19, 2025

(30) Foreign Application Priority Data
Mar. 15, 2022 (IT) ........................ 102022000005009

(51) Int. Cl.
*E05B 27/00* (2006.01)
*E05B 35/00* (2006.01)
*E05B 35/08* (2006.01)

(52) U.S. Cl.
CPC ...... *E05B 27/0053* (2013.01); *E05B 27/0017* (2013.01); *E05B 35/005* (2013.01); *E05B 35/008* (2013.01); *E05B 35/083* (2013.01)

(58) Field of Classification Search
CPC ............. E05B 27/0053; E05B 27/0017; E05B 29/004; E05B 35/005; E05B 35/008; E05B 35/083
USPC ........................................................... 70/351
See application file for complete search history.

(56) References Cited

U.S. PATENT DOCUMENTS 2,090,114 A * 8/1937 Deutsch .................. E05B 19/18 70/411
3,509,748 A * 5/1970 Trainor ................. E05B 27/083 70/389
3,648,492 A * 3/1972 Walters ................. E05B 27/083 70/404

(Continued)

FOREIGN PATENT DOCUMENTS

EP 0589209 A2 3/1994
FR 1099561 9/1955

(Continued)

*Primary Examiner* — Nathan Cumar
(74) *Attorney, Agent, or Firm* — FisherBroyles, LLP; Roger L. Browdy; Ronni S. Jillions

(57) ABSTRACT

A door lock has a body (1) equipped with an internal chamber (2), an external chamber (3) and an interspace containing a mobile unit (4) having an internal cam (40) suitable for receiving and retaining a inner key end, and an external cam (41) adapted to receive and retain an outer key end. A plurality of springs (13) are positioned in the inner chamber (2) in passages parallel to the direction of insertion of the keys; pins (15) of a plurality of pins (15), loaded by respective springs (13) of said plurality of springs (13), are slidable in respective passages extending into the inner chamber (2), in the interspace and in the outer chamber (3) along a direction parallel to the key insertion direction. The external key can be modified to open locks of this type.

14 Claims, 10 Drawing Sheets

(56) References Cited

U.S. PATENT DOCUMENTS

| | | | | | |
|---|---|---|---|---|---|
| 4,006,615 | A * | 2/1977 | Szova | E05B 27/083 | 70/491 |
| 4,233,828 | A * | 11/1980 | Dauenbaugh | E05B 27/083 | 70/491 |
| 5,040,392 | A * | 8/1991 | Matsuzawa | E05B 9/086 | 70/377 |
| 8,607,600 | B2 * | 12/2013 | Burmesch | B60D 1/60 | 70/34 |
| 2011/0192202 | A1 * | 8/2011 | Chang | E05B 27/086 | 70/449 |
| 2019/0106905 | A1 * | 4/2019 | Widén | E05B 27/0007 | |

FOREIGN PATENT DOCUMENTS

| | | | | |
|---|---|---|---|---|
| FR | 2604471 | A1 | 4/1988 | |
| GB | 2485601 | A * | 5/2012 | E05B 27/083 |

* cited by examiner

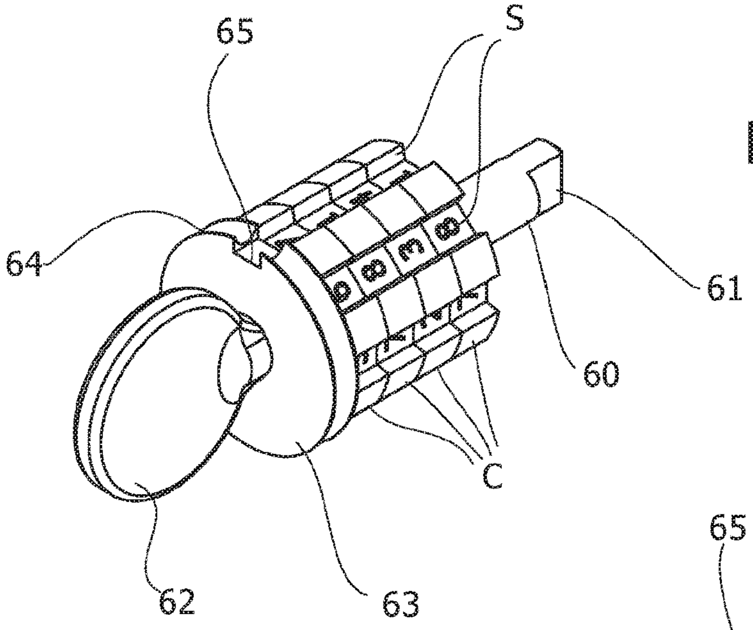
Fig. 12
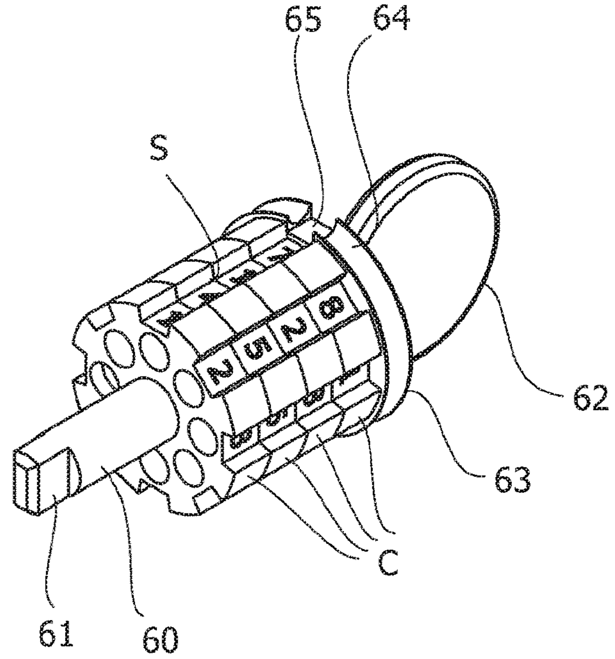
Fig. 13
Fig. 14
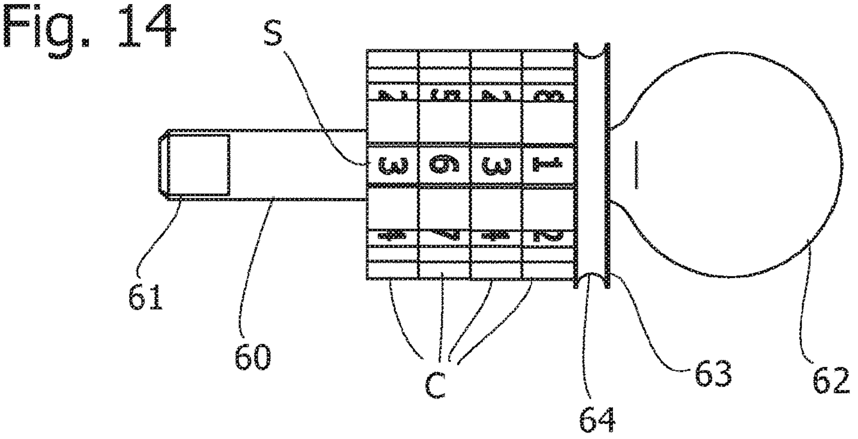

C

DOOR LOCK WITH ASSOCIATED KEYS

TECHNICAL FIELD

The present invention relates to a door lock with associated keys, in particular for a residential entrance door.

BACKGROUND ART

U.S. Pat. No. 4,006,615 A discloses a door lock with associated key, including:

- a body equipped with a chamber for inserting an external key with its external end, the chamber being coaxial to the insertion direction of the key,
- a movable equipment or device including a cam bordering on one side with said chamber and provided with a central recess suitable for receiving and retaining the end of the key,
- a multiplicity of springs positioned in the movable equipment parallel to the insertion direction of the key and individually provided with a head; and
- a plurality of pins, each pin, loaded by a spring of said plurality of springs, being slidable in a passage extending into said chamber, along a direction parallel to the insertion direction of the key.

EP 1583878 describes a lock consisting of two half-bodies positioned so that an interspace remains defined between them in which the movable equipment or device is arranged in a rotatable manner. Each half-body comprises a bushing inside which small cylinders are rotatably housed with opposite ends which protrude into the interspace and to which the movable equipment is rotatably coupled. The bushings are coaxial with each other and from them extend respective radial expansions which lie on the same longitudinal radial plane as the bushings. In the cylinders and in the radial expansions there are pins and counter-pins which, aligned with each other by the key inserted in the channels obtained in the cylinders, allow the rotation of the cylinders and, therefore, the dragging of the movable equipment.

While taking up the traditional form of lock described by way of example in the patent EP 1583878, the present invention uses, as U.S. Pat. No. 4,006,615 A, a technology specific to tubular locks, having spring-loaded pins, arranged parallel to the insertion axis of the key inside the lock. Such a lock is normally applied to a door of a piece of furniture and has no key that allows it to be opened from the inside. Examples of such types of locks can be found in GB 2485601A, U.S. Pat. Nos. 3,509,748, 3,648,492, 4,233,828, US 2011/0192202 A1.

SUMMARY OF INVENTION

An object of the present invention is to provide a lock having pins spring loaded in the insertion direction of a key, lock that can be modified simply by changing the arrangement of its internal parts.

Another object of the present invention is to provide a lock having pins spring loaded in the insertion direction of a key, lock that has an internal key and an external key.

A further object of the invention is to provide a universal external key for opening the lock.

Still another object of the invention is to allow the lock to be installed without the need to make changes to the door, to the deadbolt or to the latch bolt and to the relative housings.

To achieve the aforementioned objects, the present invention provides a door lock with relative keys, as defined in the attached claims.

BRIEF DESCRIPTION OF DRAWINGS

Further characteristics and advantages of the present invention will become most clear from the description of an embodiment of a door lock with associated keys as illustrated by an indicative and non-limiting example in the accompanying drawings, in which:

FIG. 12 is a perspective view of an embodiment of the external key for a lock according to the present invention seen from the outside;

FIG. 13 is a perspective view of the external key in FIG. 12 seen from the inside;

FIG. 14 is a side view of the external key in FIGS. 12 and 13;

Description of an Embodiment of the Invention

Figure 3:
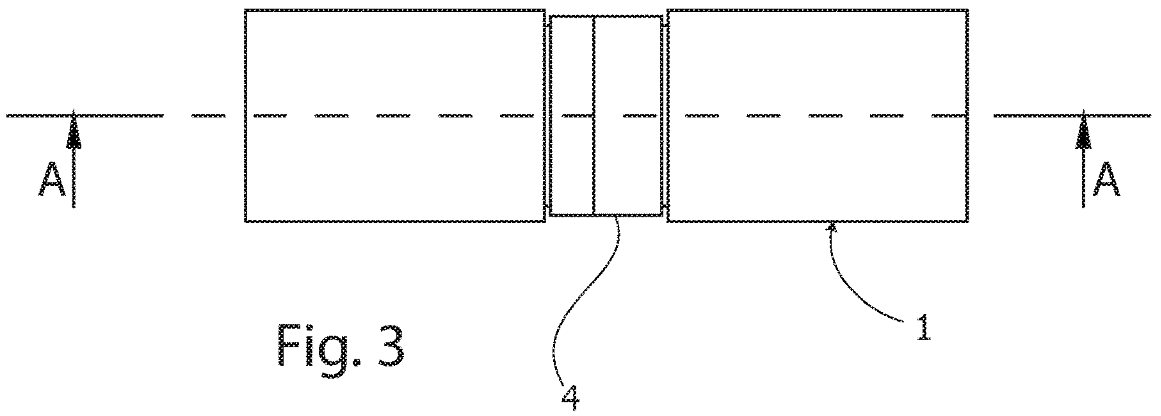
FIG. 3 is a top plan view of the lock in FIGS. 1 and 2.

Reference is initially made to FIGS. 1 to 4 which are a perspective view from the outside and a perspective view from the inside of the lock for the door according to the present invention, a top plan view thereof and a cross-section view taken along the lines A-A of the [FIG. 3].

The door lock comprises a body, indicated as a whole as 1, which is substantially the same in shape as that of a traditional cylindrical lock, having a tubular part comprising at the top two distinct coaxial bushings, joined at the bottom by a prismatic part with rounded edges. The upper tubular part has an internal chamber 2 for inserting an internal key and an external chamber 3 for inserting an external key. The keys are shown below. Traditionally, the internal chamber 2 and the external chamber 3 are coaxial to the insertion direction of the keys and separated from each other by an interspace conventionally occupied by a movable equipment or device indicated as 4. The movable equipment is suitable for mechanical actuation of a deadbolt not shown, serving the lock. The internal chamber 2 and the external chamber 3 are shown with a cylindrical internal shape but it will be understood from the continuation of the description that they can have a different internal shape, squared or polygonal, as an alternative to the cylindrical one. Furthermore, the whole body of the lock could have a different shape from that shown in the figures. If a conventional form has been adopted, it has been done to show that conventional locks can be easily replaced with the lock according to the invention without having to make major modifications to the door.

The internal chamber 2 frontally has an internal radial protrusion 20 or tooth useful for centering the key, as will be seen later, and a perforated block 21 fixed in the internal chamber 2 in a rearward position. In fact, in front of the perforated block 21 an internal key retaining device 22 is preferably positioned radially to the internal chamber 2. The internal key retaining device 22, whose function will become apparent hereinafter, comprises a first ball 23 and a first spring 24. The perforated block 21 is provided with an internal central hole 10 and with a first multiplicity of passages or tunnels indicated generically as 11 which are arranged, preferably, according to a circumference and angularly equidistant, around the internal central hole 10. The internal chamber passages 11 have one end facing the internal key, closed for example by a threaded dowel 12. A spring 13 is positioned in each internal chamber passage 11 suitably having a head 14 on the side opposite its abutment with the threaded dowel 12. The head 14 can be considered as a module M0 of a pin generically marked as 15 and shown below.

The external chamber 3, like the internal chamber 2, has frontally an external radial protrusion 30 or tooth useful for centering the key, and a perforated sleeve 31 of shorter length than that of the external chamber 3 with which it is integral. Similarly to the internal chamber 2, an external key retaining device 32 is preferably positioned radially to the external chamber 3 in front of the perforated sleeve 31. The external key retaining device 32 comprises a second ball 33 and a second spring 34. The perforated sleeve 31 is provided with an external central hole 35 and with a second multiplicity of passages, indicated generically as 36, arranged coaxially with the first multiplicity of passages of the perforated block 21. The external chamber passages 36 in the perforated sleeve 31 have a section reduction towards the outside of the perforated sleeve itself. The section reduction generically indicated as point Z, serves to limit the stroke of the pin 15 within the respective external chamber passage 36, as will be better seen later on.

The movable equipment 4 comprises an internal cam 40 shaped like an operating arm, and an external cam 41, which is tubular. The internal cam 40 is provided with an internal central recess 42, suitable for receiving and retaining the end of the internal key, as will be seen below. The external cam 41 is provided with an external central recess 43 adapted to receive and retain the external key end. The mobile unit 4 has a multiplicity of passages in the internal cam 40 and in the external cam 41, indicated generically as 44, passages which, in the rest condition of the lock, are coaxial to the first multiplicity of internal chamber passages 11 in the perforated block 21 and to the second multiplicity of the external chamber passages 36 in the perforated sleeve 31.

Figure 5:
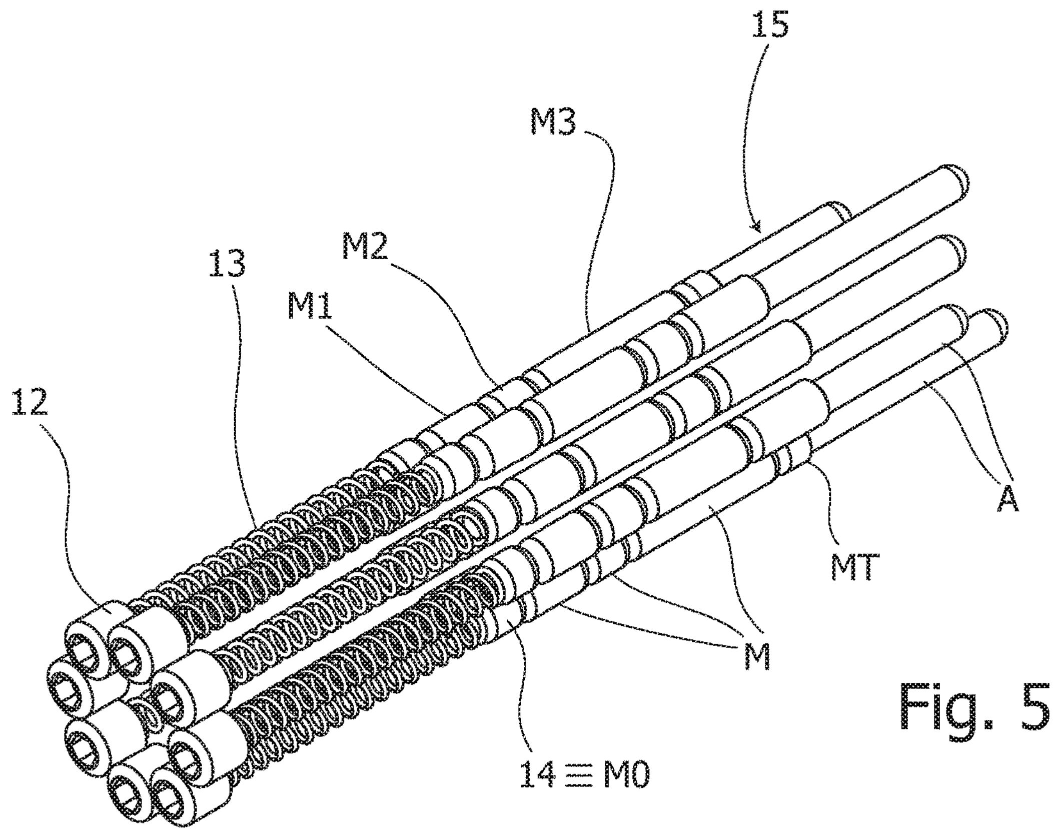
FIG. 5 is a perspective view of a pin and spring assembly employed in the lock of the present invention.
Figure 6:
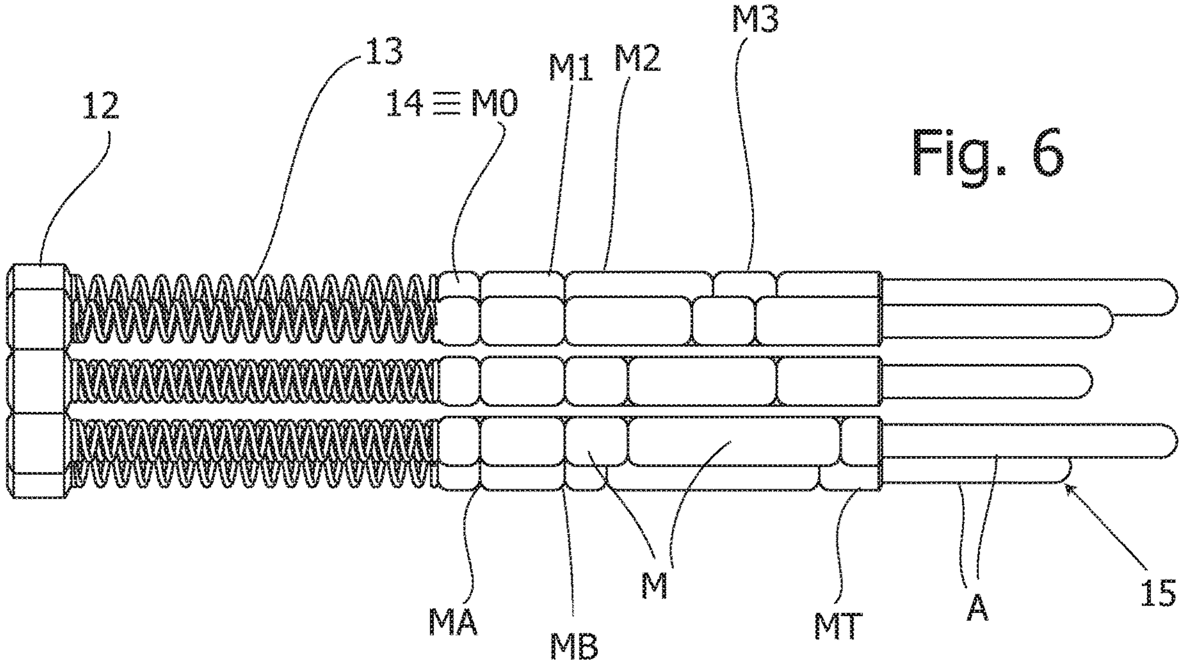
FIG. 6 is a top plan view of the pin and spring assembly in FIG. 5.
Figure 7:
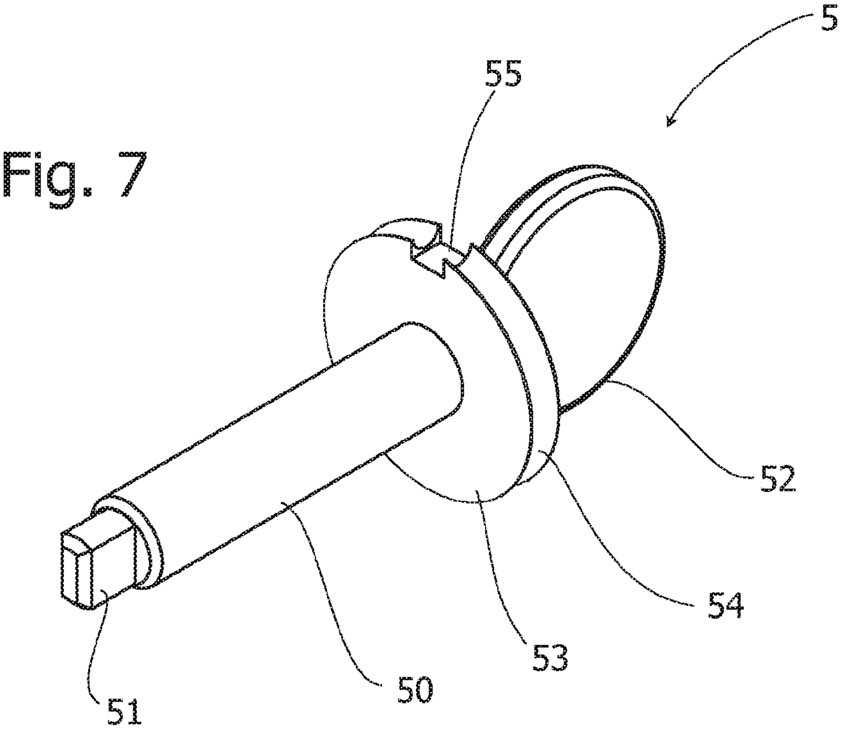
FIG. 7 is a perspective view of an internal key for the lock according to the present invention.
Figure 8:
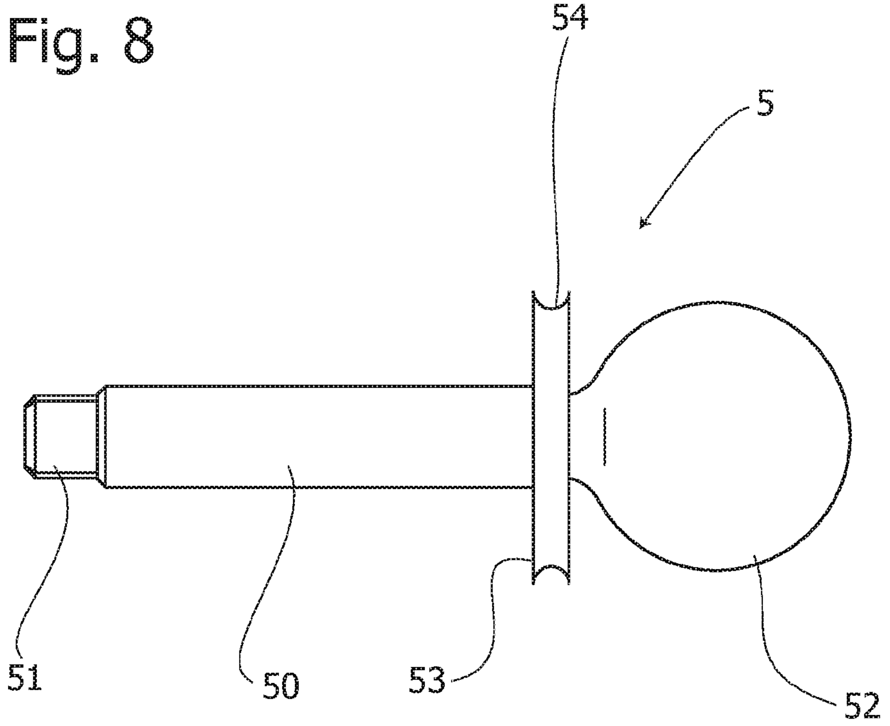
FIG. 8 is a side view of the internal key in FIG. 7.
Figure 9:
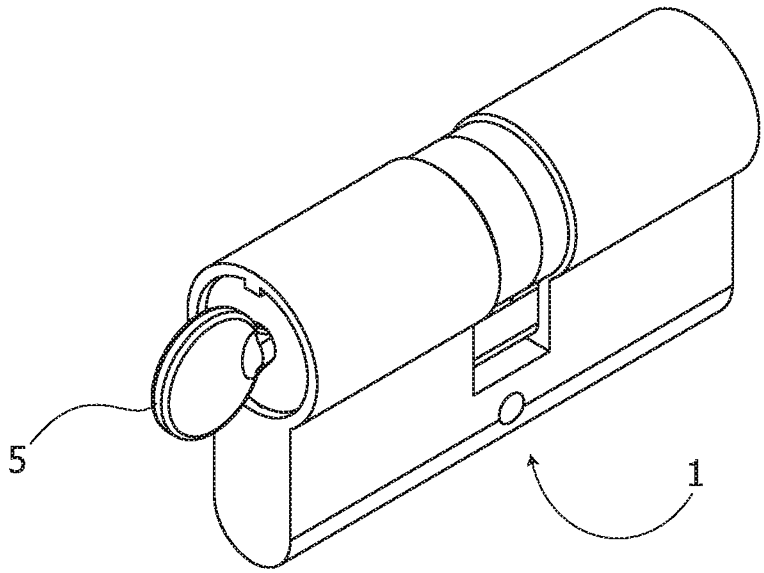
FIG. 9 is a perspective view of the lock according to the invention with the internal key inserted.
Figure 10:
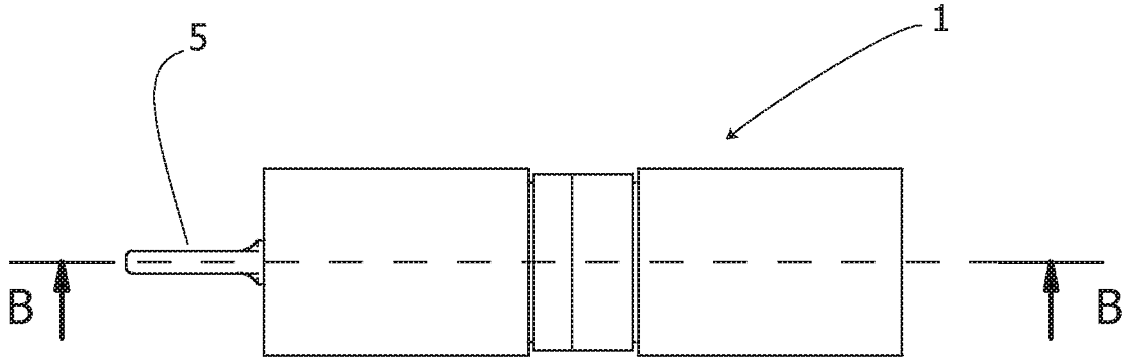
FIG. 10 is a top plan view of the lock in FIG. 9.
Figure 11:
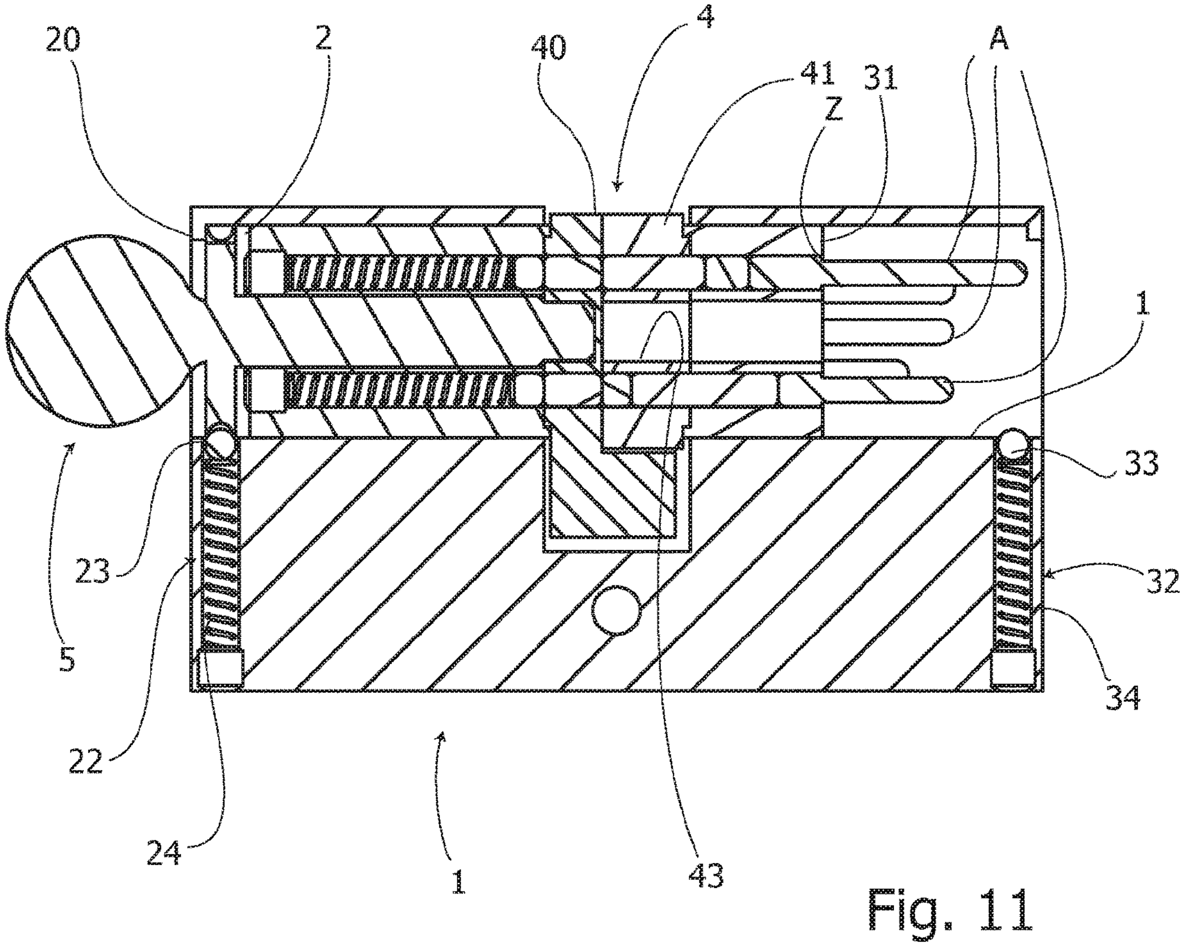
FIG. 11 is an enlarged cross-section view obtained along the lines B-B in FIG. 10.

Reference is now also made to FIGS. 5 and 6 which are a perspective view and a top plan view of the assembly formed by the pins 15 and the springs 13 in the lock according to the present invention.

As mentioned above, each spring 13 of the plurality of springs is positioned in an internal chamber passage 11 of the perforated block 21. The spring 13 abuts the threaded dowel 12 from the inside and is joined to the head 14 from the opposite side, i.e. towards the outside.

Figure 1:
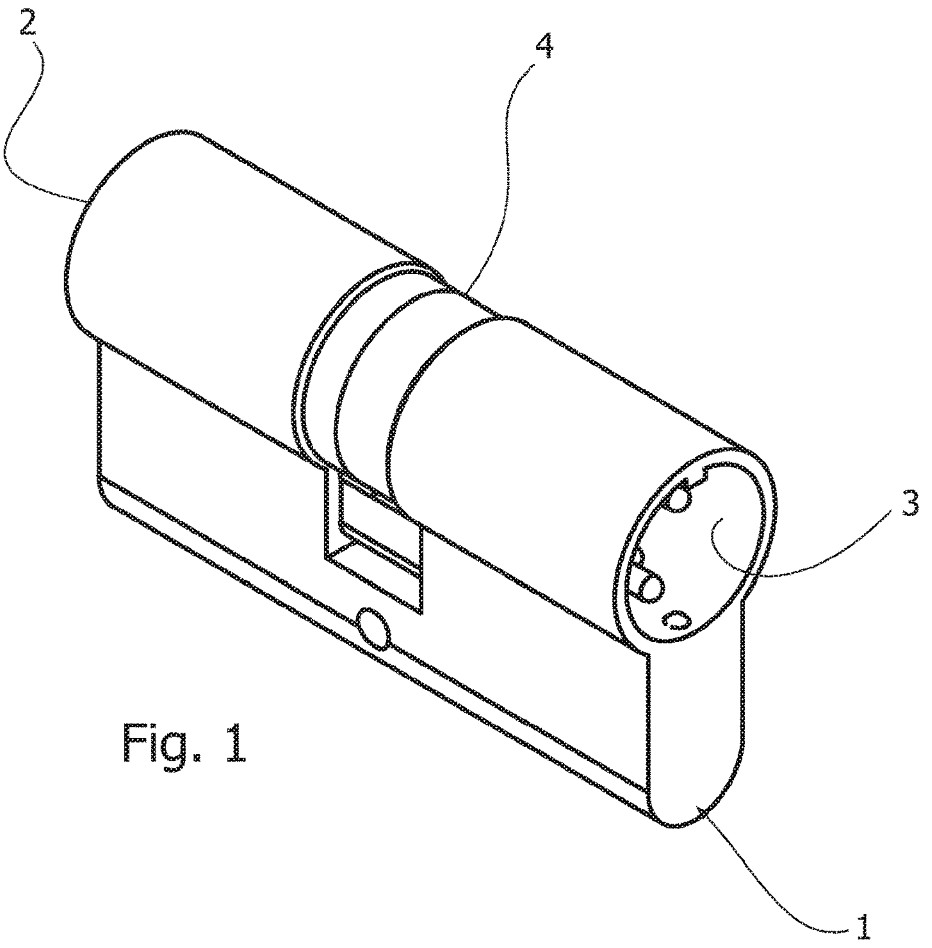
FIG. 1 is a perspective view of the lock from the outside of a home according to the present invention.
Figure 2:
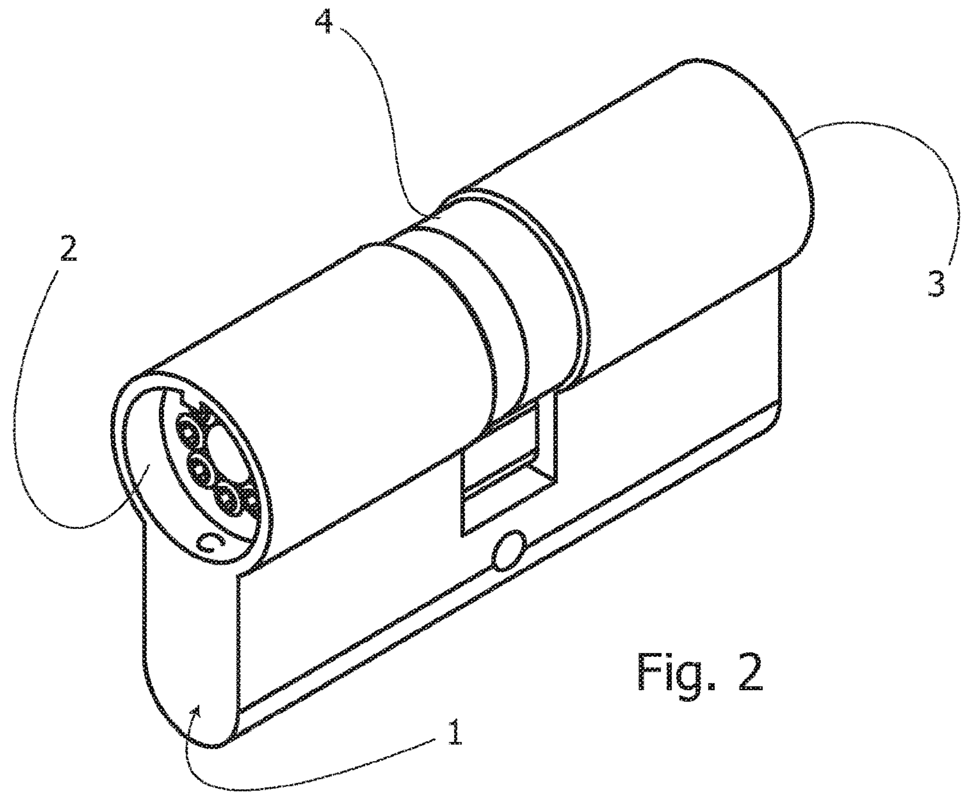
FIG. 2 is a perspective view of the lock from the inside of the home according to the present invention.
Figure 4:
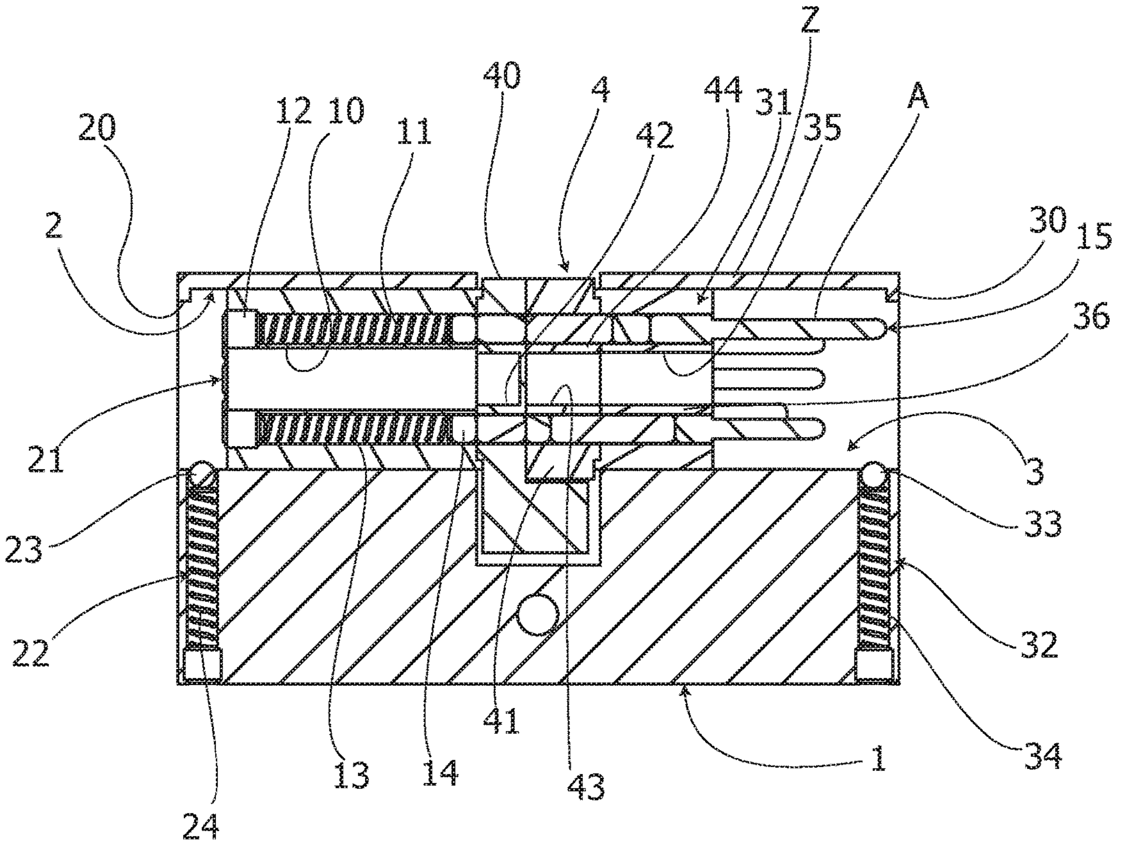
FIG. 4 is an enlarged cross-section view taken along the lines A-A in FIG. 3.

As shown in [FIG. 4], each pin 15 is loaded by a spring 13 and is partially slidable, along a direction parallel to the insertion direction of the keys, in the internal chamber passage 11, in the passage 44 of the interspace of the movable equipment 4, and in the external chamber passage 36. It should already be apparent that for the function of the lock according to the invention the internal chamber passage 11 and the external chamber passage 36 always belong to the single passage for the same pin, while the passage 44 of the interspace changes when the lock passes from the rest condition to the opening with key condition, because the interspace is occupied by the movable equipment 4.

Each pin 15 is formed by a plurality of modules M of different lengths. Although forming part of the spring, the head 14, as mentioned above, can be considered as a module M0 of the pin 15. Each module M has a first end MA facing the spring 13 of its pin 15 and a second end MB facing away with respect to this spring. The terminal modules opposite the spring, indicated with MT, are integral with needles or points indicated as A, with a smaller section than the other modules. In each pin 15, the modules M, intermediate between the head 14 and the terminal module MT, are in an embodiment three in number and are indicated by M1, M2 and M3.

As shown in [FIG. 4], the needles A, which can have different lengths, protrude from the perforated sleeve 31 from the point Z, which substantially corresponds to the end of the perforated sleeve 31 facing outwards. At point Z, the external chamber passages 36 in the perforated sleeve 31 have the section reduction suitable to prevent the pins 15 from coming out of the lock, because the MT modules abut with the point Z with their end opposite to the respective springs 13. The section reduction is also suitable to establish the rest condition determined by the springs themselves. The choice of the plurality of modules M of each pin 15 will be defined below.

Reference is now made to FIGS. 7 to 11 which are respectively a perspective view and a side view of the internal key, and a perspective view, a top plan view and a cross-section view showing the internal key inserted in the lock according to the invention.

The internal key, indicated generally as 5, has an internal key shaft 50 passing through the internal central hole 10 of the perforated block 21 in the internal chamber 2, and an internal key squared end 51 intended to engage the internal central recess 42 of the internal cam 40. The internal key 5 has a handle 52 and an internal key disc 53 provided with an internal peripheral groove 54. The internal peripheral groove 54 is interrupted by a notch 55. As shown in [FIG. 11], the internal key 5 is inserted in the internal chamber 2, by positioning the disk 53 so that the notch 55 matches the internal radial protrusion 20. This matching allows the complete insertion of the key 5 verified by the retaining device 22 comprising the first ball 23 and the first spring 24. When the internal key 5 is completely inserted inside the internal chamber 2, the first ball 23 snaps inside the internal peripheral groove 54 checking and maintaining the correct insertion of the internal key. In this position, the internal key squared end 51 is inserted into the internal central recess 42 of the internal cam 40.

Reference is now made to FIGS. 12 to 14, which are a perspective view of the external key seen from the outside and from the inside, and a side view thereof.

The external key, indicated generally as 6, has an external key shaft 60 passing through the external central hole 35 in the perforated sleeve 31, and an external key squared end 61 intended to engage with the external central recess 43 of the external cam 41. Like the internal key 5, the external key 6 has a handle 62 and an internal key disc 63 that is integral with the external key shaft 60 and is provided with an external peripheral groove 64. The external peripheral groove 64 is interrupted by a notch 65.

Furthermore, the external key 6 has at least a crown C preferably equipped with numbered peripheral grooves, indicated generically as S, which are complementary to the external radial protrusion 30 centering the external key 6.

Figure 15:
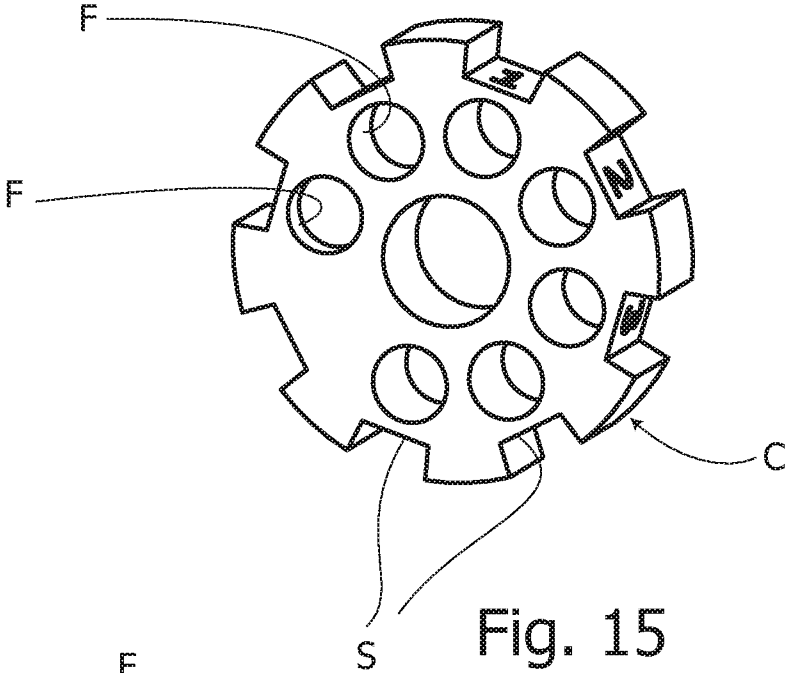
FIG. 15 is a perspective view of a crown of the external key in FIGS. 12 to 14.
Figure 16:
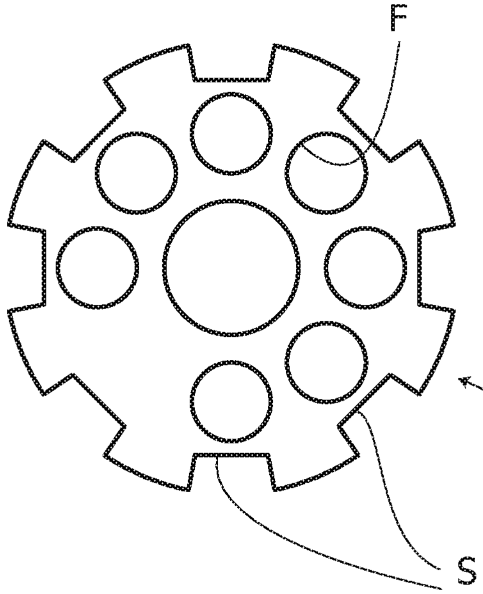
FIG. 16 is a front view of the crown in FIG. 15.
Figure 17:
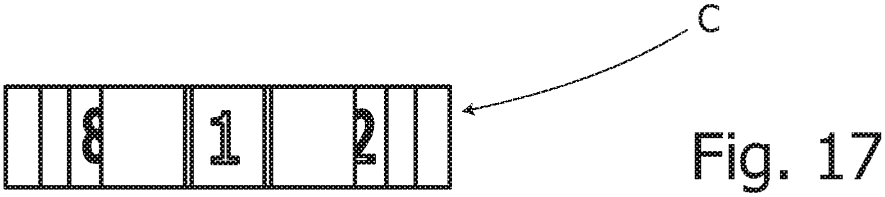
FIG. 17 is a top plan view of the crown in FIG. 15.

A crown C is shown, by way of example, in FIGS. 15 to 17 which are a perspective view, a front view and a top plan view of a crown C of the external key 6. The crown C has a plurality of holes indicated generically as F, coaxial to the multiplicity of external chamber passages 36 in the perforated sleeve 31. In each crown C the holes F can be blind of different depths, or through holes, like those corresponding to the grooves S marked as 1, 2 and 3 in the [FIG. 15]. A set of coaxial through holes F, in consecutive crowns C, forms a duct which has its own depth depending on the particular combination of the crowns C.

Figure 18:
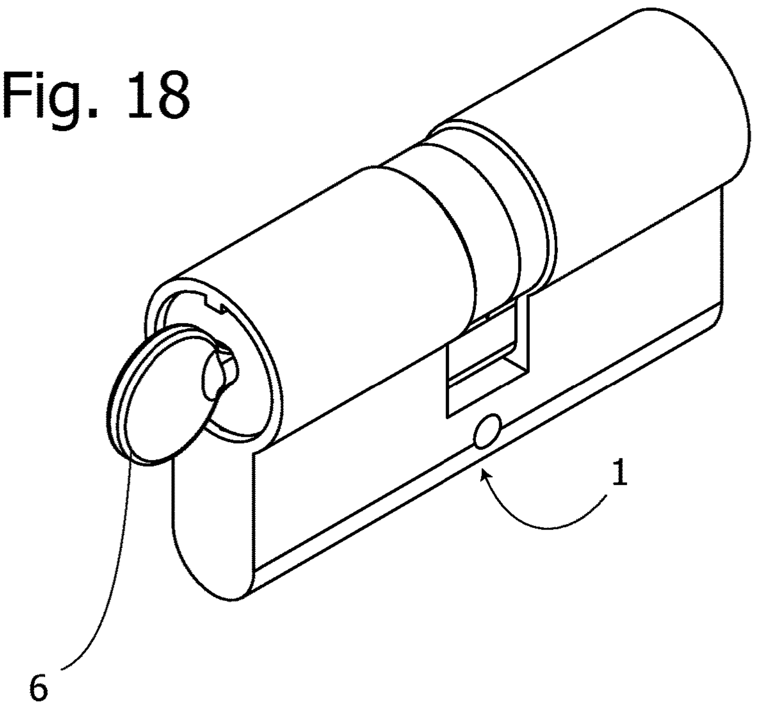
FIG. 18 is a perspective view of the lock according to the invention with the external key inserted.
Figure 19:
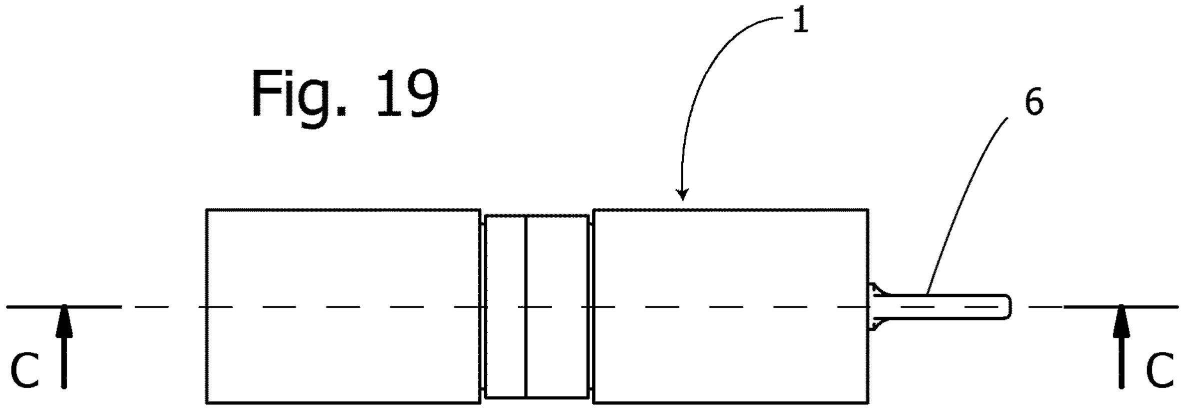
FIG. 19 is a top plan view of the lock in FIG. 18.
Figure 20:
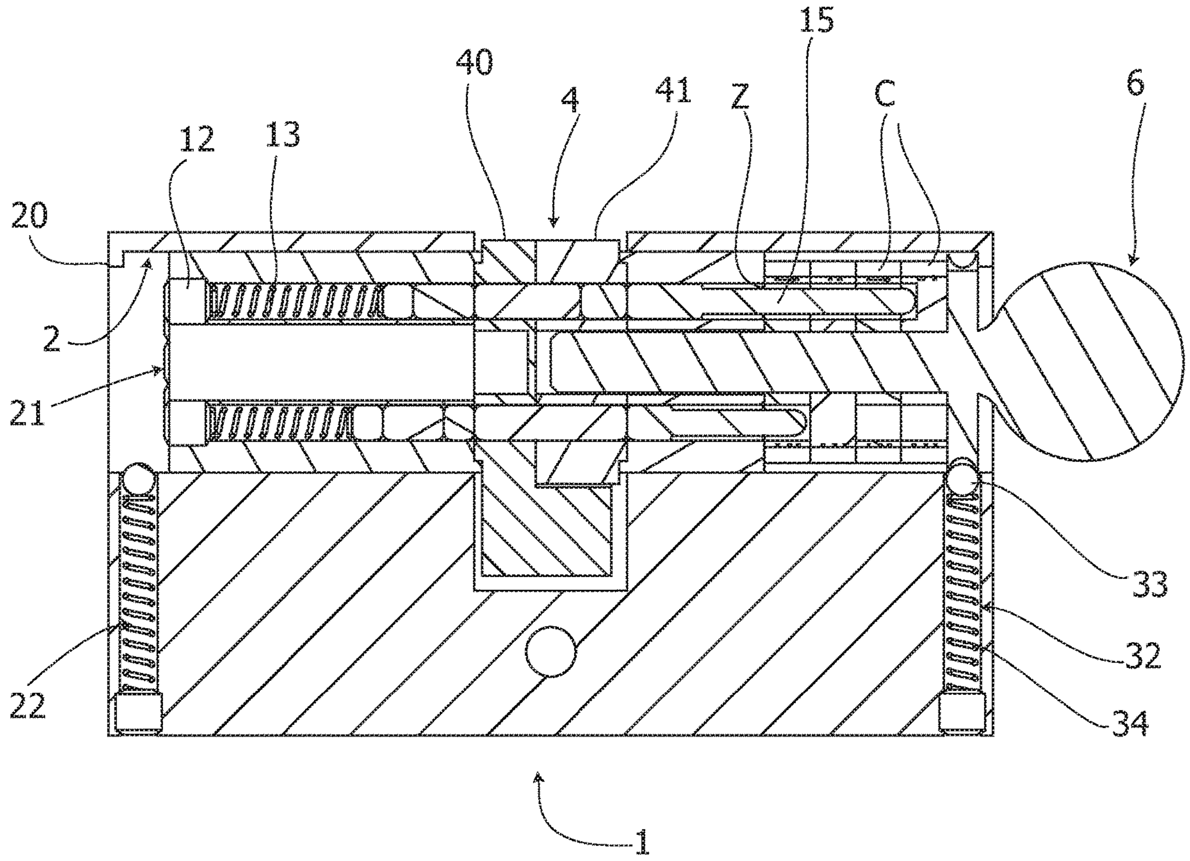
FIG. 20 is an enlarged cross-section view obtained along the lines C-C in FIG. 19.

Reference is made to FIGS. 18 to 20 which are, respectively, a perspective view, a top plan view and a cross-section view obtained along the lines C-C in the top plan view of the lock according to the invention with the external key inserted.

As shown in [FIG. 20], the external key 6 is inserted in the external chamber 3, by positioning the crowns C and the disc 63 so that the notch 65 of the crown C and the disk 63 matches the external radial protrusion 30. This matching allows the complete insertion of the external key 6. The condition of the key complete insertion is verified by the retaining device 32 comprising the second ball 33 and the second spring 34. When the external key 6 is fully inserted inside the external chamber 3, the second ball 33 snaps into the inside of the external peripheral groove 64. In this position, the external key squared end 61 is inserted into the external central recess 43 of the external cam 41.

As shown in [FIG. 20], the needles A of the terminal modules MT of the pins 15 fit inside the needles receiving ducts formed by the holes F of the crowns C. The pins 15 are, therefore, loaded against the respective spring 13 selectively by the at least one crown C or by the disk 63 which act on the needles A of the pin terminal module MT.

According to the invention, the plurality of modules M of each pin 15 is chosen so as to allow the lock to be opened by the internal key and by the external key. As shown in [FIG. 11], to allow the lock to be opened using the internal key, two of the modules M of the plurality of modules of each pin 15, including the head 14 or module M0, must delimit the boundary with their second end MB between the internal chamber 2 and the internal cam 40 and, respectively, the boundary between the internal cam 40 and the external cam 41. In fact, with this condition, the internal key 5, after inserted with internal key squared end 51 into the internal central recess 42 of the internal cam 40, can be rotated by the handle 52 because no module M of pin 15 straddles both the boundary between the internal chamber 2 and the internal cam 40 and the boundary between the internal cam 40 and the external cam 41. In other words, a module M of each pin 15, in contact with the head 14 or module M0, lies exactly inside the internal cam 40, which is of equal width, see [FIG. 4], without occupying any part of the internal chamber 2 and any part of the external cam 41. By this it is meant that the internal key 5 inserted in the internal central hole 10 of the perforated block 21 does not move any pin, but engages only the internal central recess 42. By turning the internal key 5, only the internal cam 40 is rotated, while the cam 41 remains stationary.

As shown in [FIG. 20], to allow the lock to be opened using the external key 6, the condition must be met that two of the modules M of the plurality of modules M of each pin 15 delimit with their second end MB the boundary between the internal chamber 2 and the internal cam 40 and, respectively, the boundary between the external cam 41 and the external chamber 3. In other words, if the modules are selected consecutively, the modules occupy exactly, and only, the inside of the internal cam 40 and of the external cam 41 without invading any part of the internal chamber 2 and of the external chamber 3.

If the arrangement of the crowns C in the external key 6 is not such as to respect this condition, one or more modules M straddle the aforesaid boundaries. This prevents the rotation of the movable equipment 4 and, therefore, the opening or closing of the lock, in a word, its operation.

A real embodiment of the lock according to the invention is described below.

FIGS. 5 and 6 show the pins with the relative modules of different lengths but with a diameter such as to slide within the passages. The diameter can be 2.5 mm.

In each pin 15 there are two or three modules. Module M1, the one closest to the head 14 of the spring, or module M0, is always present and has a length of 4 mm. In rest condition, the module M1 is always inside the internal cam 40 of equal length. Module M2, consecutive to module M1, is always present and its length can vary. The M3 module, whose length may vary, may not even be present. Each terminal module MT is integral with its own needle A and has different lengths. As already mentioned, the needle A has a section with a reduced diameter so as to emerge in the perforated sleeve 31 from the external chamber passage 36, which has a reduced section in the aforementioned point Z, such as to act as abutment for the terminal module MT.

Inside each passage, the spring 13 pushes the module M1 which pushes the module M2, which pushes, if present, the module M3, which pushes the terminal module MT against the end of the perforated sleeve 31, so that only the end part of needle A protrudes.

The sum of the lengths of all the modules, M1, M2, M3, of each pin, added to the length of the terminal module MT, must always equal 19 mm, so that all the internal space of the internal cam 40 and of the external cam 41 is always filled, which have a width of 4 and 6 mm respectively, and of the perforated sleeve 31, which has a length of 9 mm.

In the rest condition shown in [FIG. 4], the pins 15 are all in a rest position, in which the springs 13 push all the pins 15 towards the perforated sleeve 31, until each terminal module MT abuts the reduced section of the passage which is located in the perforated sleeve 31 at point Z. The section reduction, which is achieved in the perforated sleeve 31 in any suitable way, prevents the needles A from coming out of the external chamber 3 of the lock. In this position all the modules M1 ([FIG. 4]) are always contained only in the internal cam 40, which is 4 mm wide and is, therefore, free to rotate and allow the lock to close home from inside.

The external cam 41, in this position, remains connected to the perforated sleeve 31 which is fixed in the external chamber 3 and prevents the rotation of the external cam 41 by one or more modules.

The internal key, which allows the lock to be closed from the inside, can be replaced with a non-removable knob.

The internal key 5 may be extracted from the internal chamber 2 after a rotation of 360°, because the internal radial protrusion 20 does not allow it to exit before the complete turn. Both if the internal key 5 is present or not in the lock, it is possible to open from the outside with a key suitably set to a lock code, as will be seen below.

On the other hand, not making a complete 360° turn of the internal key 5 prevents someone from being able to open the door from the outside. In fact, the portions of the passages are not realigned.

The external key 6 is a key, preferably metallic, with dimensions of about 5 cm in total length. It allows the lock to be opened by a combination of four crowns C.

Each crown C, as shown in FIGS. 15 to 17, is a metallic element having ap-proximately the size of a 1 cent coin with a diameter of 14 mm but with a thickness of 3 mm or even greater.

Each crown C has a central hole through which passes an external key shaft 60 which supports the crown C.

Reference positions, that identify the holes F of a crown C, are numbered from 1 to 8 equidistant around the central hole of each crown C. As illustrated in [FIG. 15] and as above said, the holes F can be blind with different depths, such as 0 mm, 1 mm, 2 mm, which the needle A of the terminal module MT of the respective pins 15 abuts, or can be through holes for the same needle A.

It is assumed, as shown in [FIG. 15], that there is only one crown C and its eight reference positions have been programmed as follows:

- positions 1, 2, 3, 4, 5: the entire thickness of the crown of 3 mm is drilled with a through hole. The positions do not create an obstacle to needle A of the terminal module MT.
- position 6: closed, without any hole.
- position 7: closed at a depth of −1 mm.
- position 8: closed at a depth of −2 mm.

It is assumed that the four crowns C of the external key 6 shown in FIGS. 12 to 14 are identical, adjacent and rotating around the external key shaft 60. Their rotation produces a combination of different depths of the holes F met by the eight needles A protruding from the perforated sleeve 31 when inserting the external key. In fact, by inserting the external key, the fourth crown, the one farthest from the handle 62, is the first to come into contact with the needles A until the key hits the bottom of the perforated sleeve 31 at its end or point Z.

Depending on the combinations of the crowns C, the reference positions can be closed or of variable depth from 1 mm to 12 mm. Each needle A can:

- be immediately pushed all the way back, in case the position is closed (position 6), as mentioned above;
- or enter the key duct a few millimeters and then be pushed backwards, for the remaining length of needle A.

The length of the needle A, of the terminal module MT and of the three modules M1, M2, M3 inside the passage is programmed to meet the external key, so that no one can understand how many millimeters to push back each needle or even not be pushed at all, as will be seen later.

The opening of the lock according to the invention by using the external key is obtained in only one way: by unlocking both the internal cam 40 and the external cam 41, so that they are released from the perforated block 21 and, respectively, from the perforated sleeve 31, and by allowing the internal cam 40 and external cam 41 to rotate together. To do this, once the exact four-digit code has been inserted into the key by rotating the crowns C around the external key shaft 60, the latter, under the guidance of the external radial protrusion 30, is inserted into the external chamber 3. The external key 6 pushes the eight needles A simultaneously inside the respective passages so that one, two or three consecutive modules M1, M2 or M3 form a 10 mm combination. This combination, as programmed, must be present in each passage and must position itself in the portion of the passages inside the two cams ([FIG. 20]), or, in other words, inside and only inside the movable equipment 4. In this position, the external key squared end 61 engages the external central recess 43 of the external cam 41.

Now both cams 40, 41 are free because no module prevents their rotation. The cams, released both from the perforated block 21 and from the perforated sleeve 31, can be operated by the rotation of the external key 6, of which only the handle 62, the disk 63, the external key shaft 60 and the external key squared end 61 rotate. The crowns C remain stationary, crossed by the needles A.

The combination of the crowns C, obtained with an algorithm, allows the encounter between each of the eight needles A, protruding from the perforated sleeve 31, with the external key 6 to create an exact simultaneous thrust backwards of the needles A.

It should be understood that a pin 15, in order to be selectable and inserted into one of the passages, must have certain features. It is not random, but is selected based on the code with which a given lock has been configured. In fact, once set on the external key 6 by turning the four crowns C, the code generates different abutment depths of the needles A, each of which must correspond to a combination of modules M1, M2, M3, MT and needles A such as to push back simultaneously all the modules that hinder the external cam 41 and, at the same time, make it connect to the internal cam 40.

The combinations of the pins 15, suitable for use in the passages, have two obligatory conditions:

1) The sum of the lengths of the modules M, i.e. M1, M2, M3, and of the terminal module MT with needle A must always equal 19 mm, corresponding to the sum of the widths of the internal cam 40 (4 mm), of the external cam 41 (6 mm) and the perforated sleeve 31 (9 mm).
2) The length of one or the combination of two contiguous modules M must equal 10 mm, i.e. the width of the internal cam 40 plus the width of the external cam 41, 4 mm+6 mm.

All possible combinations of pins (about 300,000) were developed and all unsuitable ones were rejected. In fact, if certain conditions are not satisfied, the pin cannot be used in the passage, because it does not respect the algorithm, to stay inside the passage.

In order to be able to rotate together, the internal cam 40 and the external cam 41 must have one or two modules M for a total of exactly 10 mm in the passage portion inside them, so as not to invade either the perforated block 21 or the perforated sleeve 31, which do not rotate because they are fixed in the respective internal chamber 2 and in the respective external chamber 3.

At the same time, however, at least one module M, in one of the eight passages inside the cams, must be housed, even if partially, both in the internal cam 40 and in the external cam 41. In fact, the external key 6 engages the external central recess 43 of the external cam 41 that is closed in its bottom to prevent access of lock picks in the internal cam 40, which has the operating arm or rotation pawl. By at least one module M which connects the internal cam 40 and the external cam 41, the rotation of the external cam 41 drives the internal cam 40 and the pawl which opens the lock.

Below is a practical example of lock programming. A lock with the code 2754 is assumed to be coded. It should be understood that this fantasy number is representative of a certain combination in the position of the crowns C of the key, combination that determines the depth of the needle receiving ducts in relation to the composition of the pins 15 of the lock. The example is developed in the following Table 1.

TABLE 1

Secret code 2754

| Passage | A mm M1 | B mm M2 | C mm M3 | D mm MT | E mm Needle | F Abut position depth in the key | G How many mm the needle withdraws |
|---|---|---|---|---|---|---|---|
| 1 | 4 | 7 | 3 | 5 | 14 | 10 | 4 |
| 2 | 4 | 6 | 3 | 6 | 11 | 11 | 0 |
| 3 | 4 | 3 | 7 | 5 | 10 | 6 | 4 |
| 4 | 4 | 3 | 10 | 2 | 14 | 7 | 7 |
| 5 | 4 | 2 | 10 | 3 | 9 | 3 | 6 |
| 6 | 4 | 5 | 5 | 5 | 4 | 0 | 4 |
| 7 | 4 | 4 | 10 | 1 | 9 | 1 | 8 |
| 8 | 4 | 3 | 10 | 2 | 9 | 2 | 7 |
| | CAM 40 | CAM 41 | | Point “Z” | | | |
| | 4 mm | 6 mm | | — | | | |

By setting this code on the external key 6 by rotating the four crowns C, a duct receiving a needle A is created in each of the eight positions. Each duct, with a diameter of 2.5 mm, has different depths as indicated in the column “F” of the diagram above. Each passage also indicates the eight pins that have been inserted in the passages because they are suitable for meeting a key that has that code set.

Here’s how the external key 6 acts when it meets the needles A and what happens.

Passage 1

In the pin inside passage 1, the modules M2 and M3 are chosen (the sum of which makes 10 mm) to be moved inside the two cams 40 and 41. This means that the module M1, which is not needed, should be moved towards the perforated block 21. Since the duct of the key that will meet the needle A is 10 mm (coordinate F1 of the previous diagram), the algorithm, in this case, has chosen for that pin a 14 mm long needle (coordinate E1). By inserting the key, the needle enters the key duct, in position 1, 10 mm, but it is then pushed towards the perforated block 21 another 4 mm, “eliminating” the module M1 which exit the internal cam 40 entering the perforated block 21.

Passage 2

In the pin inside passage 2, the modules M1 and M2 (10 mm sum) are used; but the two modules are already in the perfect position, so they will not be moved at all. The algorithm in this example has chosen for this pin an 11 mm needle (coordinate E2), in fact the depth of the duct of the external key in that correspondence is equally 11 mm (coordinate F2). This means that the key at that point will “swallow” the whole needle without moving it a millimeter. From the outside, looking at the needle, one cannot imagine that it should not be pushed to open the lock, so a potential attacker will block the cams by trying to push it.

Passage 3

In the pin inside passage 3, modules M2 and M3 (3+7 mm=10 mm) will be taken to be moved inside the two cams 40 and 41. This means that module M1 should be moved 4 mm towards the perforated block 21 (as for passage 1 above) but having created a different depth of 6 mm in the key in position 3 (coordinate F3) the algorithm has chosen a 10 mm needle. The needle will enter the duct of the key 6 mm, to then be pushed another 4 mm backwards, so that the module M1 is moved out of the internal cam 40 into the perforated block 21.

Passage 5 (Passage 4 is Skipped)

In the pin inside passage 5, only the 10 mm long module M3 will be taken to be moved alone inside the two cams. This means that module M1 together with module M2 shall be moved 6 mm towards the perforated block 21.

Since the duct of the key in that position is 3 mm (coordinate F5), the algorithm puts a 9 mm needle in the pin. At that point, the key will make the needle enter 3 mm, then push it another 6 mm and make both modules M1 and M2 slide out.

Passage 6 (Closed Reference Position)

In the pin inside passage 6 the 10 mm modules M2 and M3 will be taken, so module M1 shall be pushed 4 mm in total out of the cams. However, one can note that in that position the code matches an immediately closed reference position, in fact the depth is zero (coordinate F6) and therefore the key will push the needle met by it along its entire length.

Module M1 needs to be pushed away 4 mm; for this reason, the algorithm inserts a 4 mm needle (coordinate E6) into the pin which will be pushed along its entire length towards the perforated block 21.

In this example, in Passages 1, 3, 4, 5, 6, 7, 8 there is the other condition for which at least one module M must simultaneously occupy both cams so as to connect them together and allow activation of the pawl by moving only the external cam 41 which drives the internal cam 40.

It will be appreciated that the number of pins suitable for the operation of the key has many thousands of combinations.

The number of combinations between key and pins, for the eight positions that can be generated, is tens of thousands, and each different code moves and changes the depths of the eight ducts of the external key into which the needles will enter, bringing to thousands of thousands the possible combinations.

There is no way or algorithm that can help to understand, by observing from the outside the needles alone, that are the only visible part of the whole lock, how much to withdraw the eight needles at the same time, without knowing the combination of the lock.

It can be assumed that the horizontal sliding of the pins limits and nullifies any known burglary technique.

This makes it impossible for a thief to decode the cylinder. This makes the security level of the key extremely high.

It has been seen that the external key has thousands of possible combinations.

For each code set, the key mixes a different depth for the eight abutment positions in opposition to the needles it will encounter, ranging from 0 to 12 mm.

The 12 mm depth of a duct in the key will occur when all the through holes occur in one position (4 crowns×3 mm thickness).

For each depth that is created in the key by setting a code, a series of pins suitable for that depth have been selected with mathematical algorithms. There are about three hundred suitable pins, all different.

The lock can be coded randomly or a personal code can be required and if there are more doors to manage with the same key, locks can be purchased with consecutive or customizable codes so that they can be remembered better.

The codes are comparable to credit card pins, but using them every day will make them easy to remember.

Once the door has been opened with the key according to the present invention, to prevent one's secret combination from being seen by someone on the key, one should remember to mix the four crowns, as is normally done with a combination lock.

In the event that someone discovers the cylinder code, it will still be possible to reprogram it, without disassembling the lock. It will be sufficient to replace only the pins inside the passages, with a simple operation that is very easy and can be carried out by anyone: by unscrewing the threaded dowels 12 ([FIG. 5] and 6), the pins are extracted, pushing them away from the side of the needles and the new ones, with the different coding, are inserted. Easy systems for the extraction and replacement of the pins can be set up directly in hardware stores.

To open the door, it will be sufficient to enter the new code on the key, inexpensively and without changing anything.

It is believed that the invention can solve current problems related to home safety.

Currently, to close a door it is necessary to have a key and a cylinder that are complementary and corresponding. One key only opens one cylinder. If one person has more locks, he/she will need to have a key for each lock. If that person loses the keys of a house, he/she will have to change the cylinder and the keys. When a person has several locks to open, he/she often collects several keys in the same set, and if he/she loses it, various cylinders have to be replaced at the same time (home, shop, garage, office, etc.) for fear that someone might find them and enter home, shop, garage, office, etc. Furthermore, if the keys are accidentally left inside home—which is statistically very common—a locksmith, who will force the lock, must be called. The expenses are huge.

With the key according to the present invention, all this can be avoided. It is also possible to leave the internal key inserted without the danger of not being able to open from the outside anymore.

If today we lose the house key, we can't get back in. With the lock and key according to the present invention, it is sufficient to borrow a key of the same type from a friend or a resident with which to open home, after having set the right code and, calmly, to buy a new one as soon as possible.

Furthermore, once inside home, we can prevent someone from opening it from the outside, leaving the internal key in the locking position.

The lock according to the present invention protects against the today usual burglary techniques.

All current locks have critical points where thieves work to pass them and enter homes.

There are various burglary systems among which the best known are:

Bumping: hitting a "null" key inserted inside the cylinder to align the pistons and open;

Picking or lock picking: technique with which the pins are teased using lock picks to easily find the combination; you often see it in the movies but it's just like that in reality too;

Bulgarian key or intelligent key, magic key, quick opener: it consists of "copying" a double-bitted key in a few minutes using various techniques;

Perforation of the defender: very invasive technique which tends to perforate the cylinder protection and follow the perforation of the entire cylinder;

Breakage of the cylinder: with special keys it is possible to break the internal cylinder and access the part that rotates the lock.

It is believed that the present invention eliminates all these problems as well as having no problem on the decay of the magnetization of its components, techniques often used in many keys and cylinders currently in circulation, as both totally devoid of any magnet inside.

Ultimately, the advantage of the lock according to the present invention is that it is purely mechanical.

The invention claimed is:

1. Door lock with associated keys, comprising:

a body (1) equipped with an external chamber (3) for inserting an external key (6) with its external end, and a movable equipment (4) or device suitable for the mechanical operation of a latch serving the lock, said movable equipment (4) comprising an external cam (41), bordering the external chamber (3) and provided with an external central recess (43) adapted to receive and retain the external key end, a plurality of springs (13), each spring (13) being placed in a passage parallel to an insertion direction of the external key (6); and a plurality of pins (15), each pin (15), loaded by the spring (13), being slidable in said passage;

characterized in that said external chamber (3) of the body (1) has a perforated sleeve (31) that is integral with the external chamber (3) and is equipped with an external central hole (35) for inserting the external key (6) and with a plurality of external chamber passages (36) made circumferentially around the external central hole (35) parallel to the insertion direction of the external key (6);

the body (1) is also equipped with an internal chamber (2) for inserting an internal key (5) with its internal end, the internal chamber (2) being coaxial to the external chamber (3) in the insertion direction of the keys and separated from the external chamber (3) by an interspace;

said internal chamber (2) has a perforated block (21) that is integral with the internal chamber (2) and is equipped with:

an internal central hole (10) coaxial to the external central hole (35) of the perforated sleeve (31), and a plurality of internal chamber passages (11) that are formed circumferentially around the internal central hole (10) coaxially to the plurality of external chamber passages (36) and have a closed end facing the internal key (5), each internal chamber passage (11) receiving a spring (13) and a pin (15);

said movable equipment (4) further comprises an actuating arm shaped internal cam (40) provided with an internal central recess (42) suitable for receiving and retaining said internal key end, the internal cam (40) having a boundary, on the one hand, with said internal chamber perforated block (21) and, on the other hand, with said external cam (41), said internal cam (40) and said external cam (41) having a plurality of movable equipment passages (44) coaxial both to the plurality of internal chamber passages (11) and to the plurality of external chamber passages (36);

each pin (15), slidably positioned in a respective internal chamber passage (11), in a respective movable equipment passage (44) and in a respective external chamber passage (36), is formed by a plurality of modules (M);

the modules (M) are arranged so that when the internal key (5) or no key is inserted in the lock, no module straddles the boundary between the internal cam (40) and the perforated block (21) and also no module straddles the boundary between the internal cam (40) and the external cam (41), whereby the internal cam (40) is able to rotate relative to the external cam (41), and when the external key (6) is inserted in the lock, no module straddles the boundary between the internal cam (40) and the perforated block (21) and also no module straddles the boundary between the external cam (41) and the perforated sleeve (31), whereby the internal cam (40) and the external cam (41) are able to rotate together.

2. Door lock with associated keys according to claim 1, wherein the perforated sleeve (31) has a shorter length than that of the external chamber (3), and the plurality of the external chamber passages (36) has a reduction in section (point Z) towards the outside; and each pin (15) has a terminal module (MT) integral with a needle (A) on the opposite side of the spring (13) so as to be retained in its own external chamber passage (36).

3. Door lock with associated keys according to claim 1, wherein the internal key (5) has:

an internal key shaft (50) passing through the internal central hole (10) of the internal chamber perforated block (21), an internal key squared end (51) configured for engaging said internal central recess (42), and an internal key disk (53) integral with said internal key shaft (50) on the opposite side of said internal key squared end (51).

4. Door lock with associated keys according to claim 3, wherein said internal chamber (2) has at the front an internal radial protrusion (20) for centering the internal key, and said internal key disk (53) has a notch (55) configured in such a way as to be crossed by said internal radial protrusion (20).

5. Door lock with associated keys according to claim 3, wherein an internal key retaining device (22) in the form of a first spring-loaded ball (23) is positioned radially in front of the internal chamber perforated block (21) and the internal key disc (53) is provided with an internal peripheral groove (54) with which said first ball (23) is able to radially engage, capable of verifying the correct insertion of the internal key (5).

6. Door lock with associated keys according to claim 1, wherein the external key (6) includes:

an external key shaft (60) configured to pass into the external central hole (35) of the perforated sleeve (31), and an external key squared end (61) configured to engage with said external central recess (43) of the external cam 41, at least one crown (C), equipped with a plurality of holes (F) for receiving the needles (A) of the terminal modules (MT), the plurality of holes (F) being coaxial to the multiplicity of the external chamber passages (36), and an external key disk (63) integral with the external key shaft (60) suitable for acting as a stop for at least one crown (C).

7. Door lock with associated keys according to claim 6, wherein each hole (F) of the plurality of holes (F) of a crown (C) has a depth, in a direction parallel to the external key shaft (60), which varies from a zero depth, i.e. lack of hole, so that the needle (A) of the terminal module (MT) abuts the crown (C), up to a through hole so that each pin (15) is loaded against the respective spring (13) selectively by the at least one crown (C) or by the disk (63) integral with the external key shaft (60) which act on the needle (A) of the pin terminal module (MT).

8. Door lock with associated keys according to claim 6, wherein said external chamber (3) has at its front an external radial protrusion (30) for centering the external key, and said external key disk (63) has a notch (65) configured so as to be crossed by said external radial protrusion (30).

9. Door lock with associated keys according to claim 6, in wherein an external key retaining device (32) in the form of a second spring-loaded ball (33) is positioned radially in front of the external chamber sleeve (31), and the external key disc (63) is equipped with an external peripheral groove (64) with which said second ball (33) is able to radially engage, capable of verifying the correct insertion of the external key (6).

10. Door lock with associated keys according to claim 6, wherein each crown (C) has circumferentially a plurality of alphanumeric references which identifies said plurality of holes (F) of the crown (C).

11. Door lock with associated keys according to claim 7, wherein each alphanumeric reference is situated in a notch of each crown (C).

12. Door lock with associated keys according to claim 6, wherein the crowns (C) are four in number.

13. Door lock with associated keys according to claim 9, wherein said alphanumeric references are eight in number.

14. Door lock with associated keys according to claim 1, wherein the end facing the internal key (5) of said plurality of internal chamber passages (11) in the perforated block (21) is closed with a threaded dowel (12).

* * * * *